(12) United States Patent
Reitan et al.

(10) Patent No.: US 9,274,644 B2
(45) Date of Patent: Mar. 1, 2016

(54) SYNCHRONIZATION OF ACTIVE STYLUS AND TOUCH SENSOR

(71) Applicants: Odd Magne Reitan, Trondheim (NO); Eivind Holsen, Trondheim (NO)

(72) Inventors: Odd Magne Reitan, Trondheim (NO); Eivind Holsen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 178 days.

(21) Appl. No.: 13/975,926

(22) Filed: Aug. 26, 2013

(65) Prior Publication Data

US 2015/0054776 A1 Feb. 26, 2015

(51) Int. Cl.
| | |
|---|---|
| G06F 3/041 | (2006.01) |
| G06F 3/0354 | (2013.01) |
| G06F 3/038 | (2013.01) |
| G06F 3/044 | (2006.01) |

(52) U.S. Cl.
CPC .............. *G06F 3/0416* (2013.01); *G06F 3/038* (2013.01); *G06F 3/03545* (2013.01); *G06F 3/044* (2013.01)

(58) Field of Classification Search
CPC ........................... G06F 3/0416; G06F 3/03545
USPC ........................................... 345/174; 370/516
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2004/0233937 A1* | 11/2004 | Ruat et al. ..................... 370/516 |
| 2009/0315854 A1 | 12/2009 | Matsuo | |
| 2012/0105362 A1* | 5/2012 | Kremin et al. ................. 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO WO 2012/129247 A2 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Amare Mengistu
*Assistant Examiner* — Joseph G Rodriguez
(74) *Attorney, Agent, or Firm* — Baker Botts L.L.P.

(57) ABSTRACT

In one embodiment, a method includes receiving a synchronization signal from a computing device and determining a first time associated with detection of a first edge of the synchronization signal. The method also includes determining a second time associated with detection of a second edge of the synchronization signal and determining whether the second time occurs within a first predetermined window of time from the first time. The method further includes, if the second time occurs within the first predetermined window of time from the first time, then determining that the synchronization signal is valid.

20 Claims, 9 Drawing Sheets

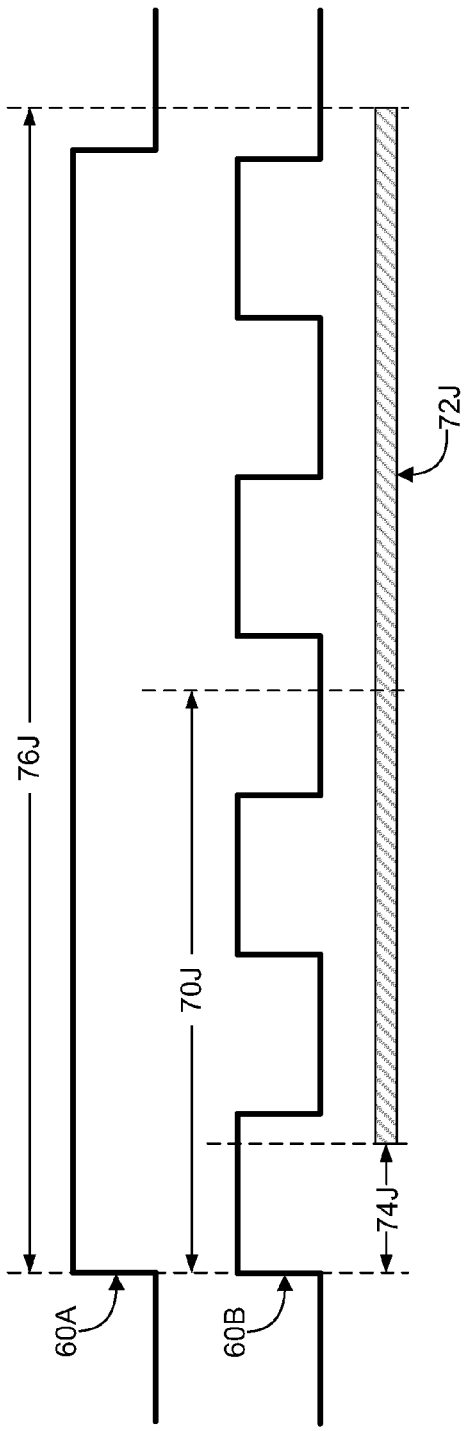
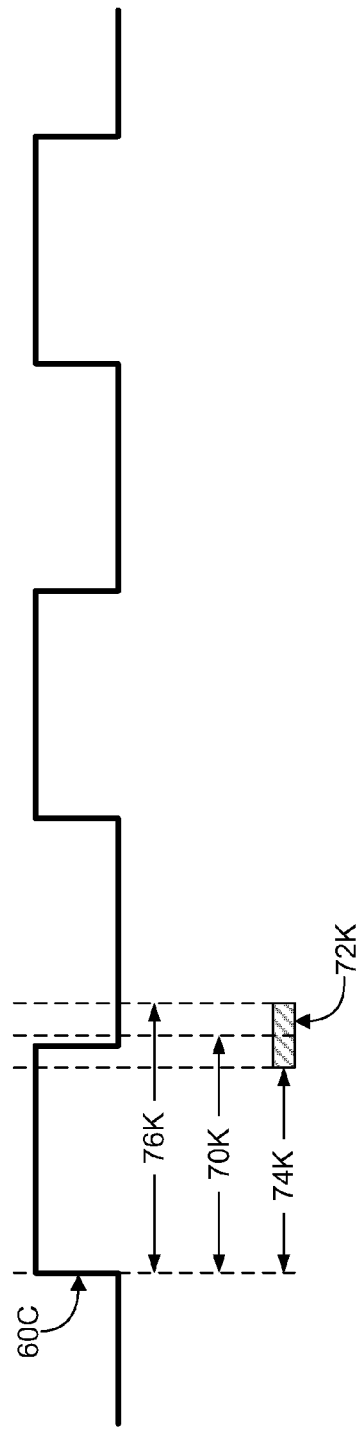
FIGURE 7A
FIGURE 7B

SYNCHRONIZATION OF ACTIVE STYLUS AND TOUCH SENSOR

TECHNICAL FIELD

This disclosure generally relates to touch sensors and active styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIGS. 7A-7B illustrate other example synchronization signals with example synchronization parameters.

DESCRIPTION OF EXAMPLE EMBODIMENTS

Figure 1:
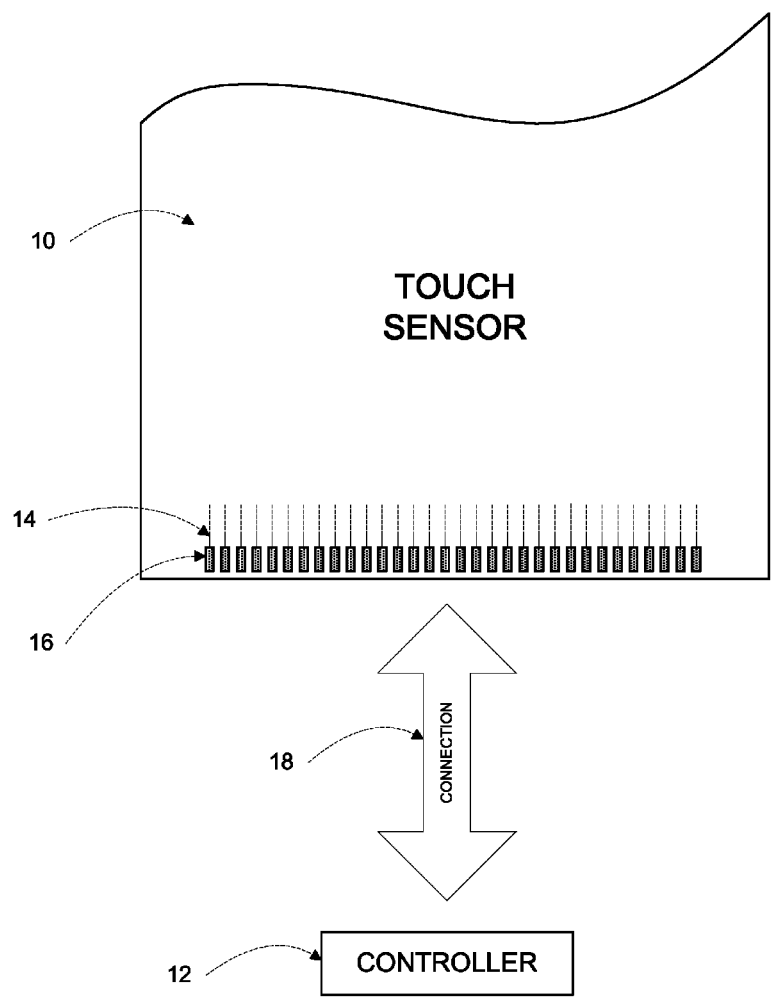
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
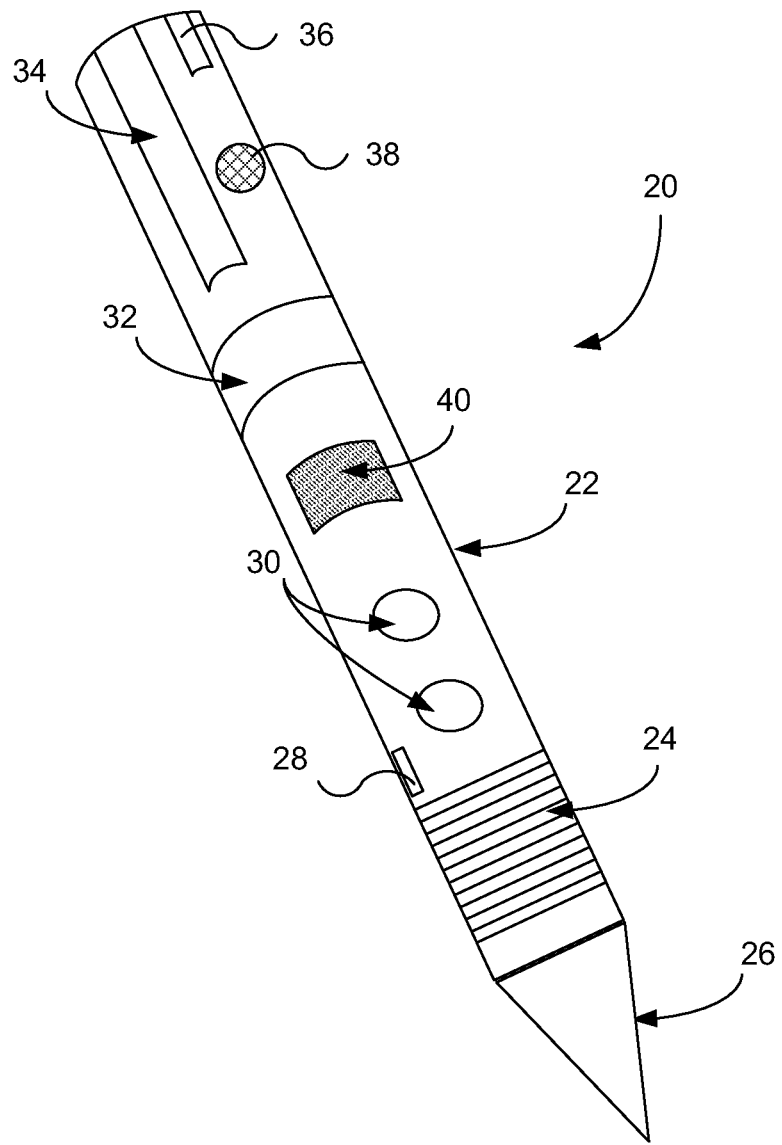
FIG. 2 illustrates an example active stylus exterior.

FIG. 2 illustrates an example exterior of an example active stylus 20, which may be used in conjunction with touch sensor 10 of FIG. 1. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using an FPC.

Active stylus 20 may have one or more components configured to provide feedback to or accept feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or an electrophoretic display. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. By way of example and without limitation, the electrodes of active stylus 20 may reside on outer body 22 of active stylus, in active-stylus tip 26, or on or in any other suitable part of active stylus 20. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
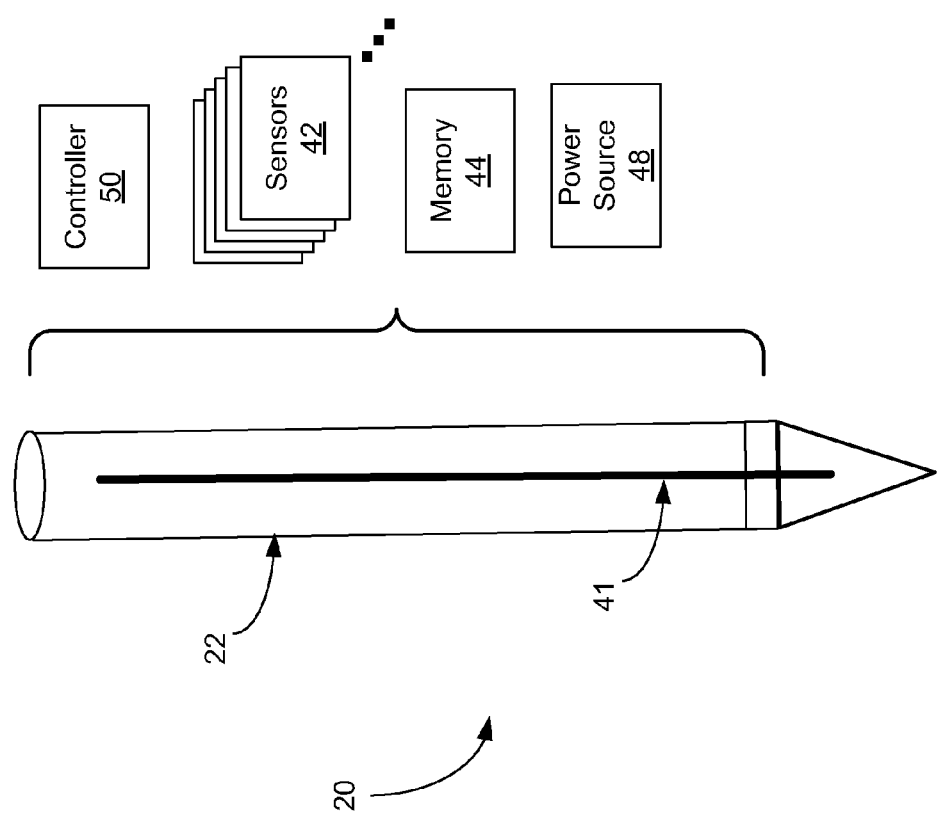
FIG. 3 illustrates an example active stylus interior.

FIG. 3 illustrates example internal components of an example active stylus 20. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of computing device or processor suitable for controlling the operation of active stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in active stylus 20, either via drive or sense units or directly. The drive unit may supply signals to electrodes of tip 26 through center shaft 41. The drive unit may also supply signals to control or drive sensors 42 or one or more external components of active stylus 20. In particular embodiments, the drive unit of active stylus 20 may be configured to transmit a signal that may be detected by electrodes of touch sensor 10. As an example and not by way of limitation, the drive unit of active stylus 20 may include a voltage pump or a switch, such that the voltage pump may generate a high voltage signal, or the switch may toggle the potential of tip 26 between zero voltage and one or more pre-determined voltage levels. The drive unit of active stylus 20 may transmit a signal, such as a square wave, sine wave, or digital-logic signal, that may be sensed by the electrodes of touch sensor 10. In particular embodiments, the drive unit of active stylus 20 may transmit a signal to the electrodes of touch sensor 10 by applying a voltage or current to electrodes of tip 26 that results in charge removal or charge addition to the electrodes of touch sensor 10, mimicking a touch or anti-touch of a finger on a pulse-by-pulse basis.

The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered or recharged by a wired connection through an applicable port coupled to a suitable power source.

Figure 4:
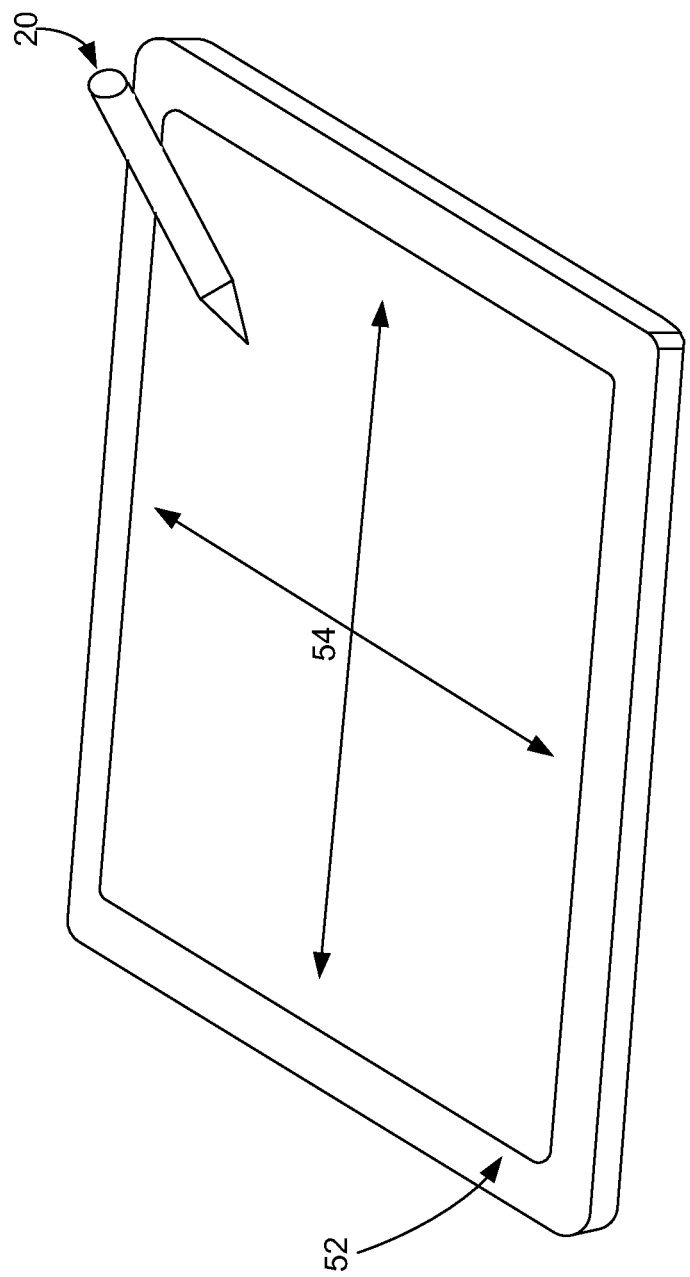
FIG. 4 illustrates an example active stylus with an example device.

FIG. 4 illustrates an example active stylus 20 with an example device 52. One example of device 52 is touch screen 10 of FIG. 1. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example and not by way of limitation, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device 52 by processing a drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, noise from device 52 display, stylus circuitry noise, or external noise. The overall noise external to active stylus 20 may have frequency characteristics covering a wide range of the spectrum, including narrow-band noise and wide-band noise, as well.

In particular embodiments, a signal may be received by one or more electrodes capable of sensing signals in active stylus 20. These electrodes may reside on active-stylus tip 26. The signal received by the electrodes in active stylus 20 may then be transmitted from the electrodes to controller 50. In particular embodiments, a signal may be transmitted to controller 50 via center shaft 41. Controller 50, as discussed above, may include, without limitation, a drive unit, a sense unit, a storage unit, and a processor unit. In particular embodiments, a received signal may be amplified by any suitable amplifier, including a digital or an analog amplifier. In particular embodiments, a received signal may be filtered by any suitable filter, including a digital or an analog filter. In particular embodiments, device 52 may transmit data to active stylus 20 by sending data to one or more drive electrodes of touch sensor 10, and active stylus 20 may receive data via electrodes of tip 26. In particular embodiments, after active stylus 20 and device 52 are synchronized, active stylus 20 may transmit data to device 52 by performing charge addition or charge removal on one or more sense electrodes of touch sensor 10, and device 52 may receive data sent from active stylus 20 by sensing data with one or more sense electrodes of touch sensor 10.

Figure 5:
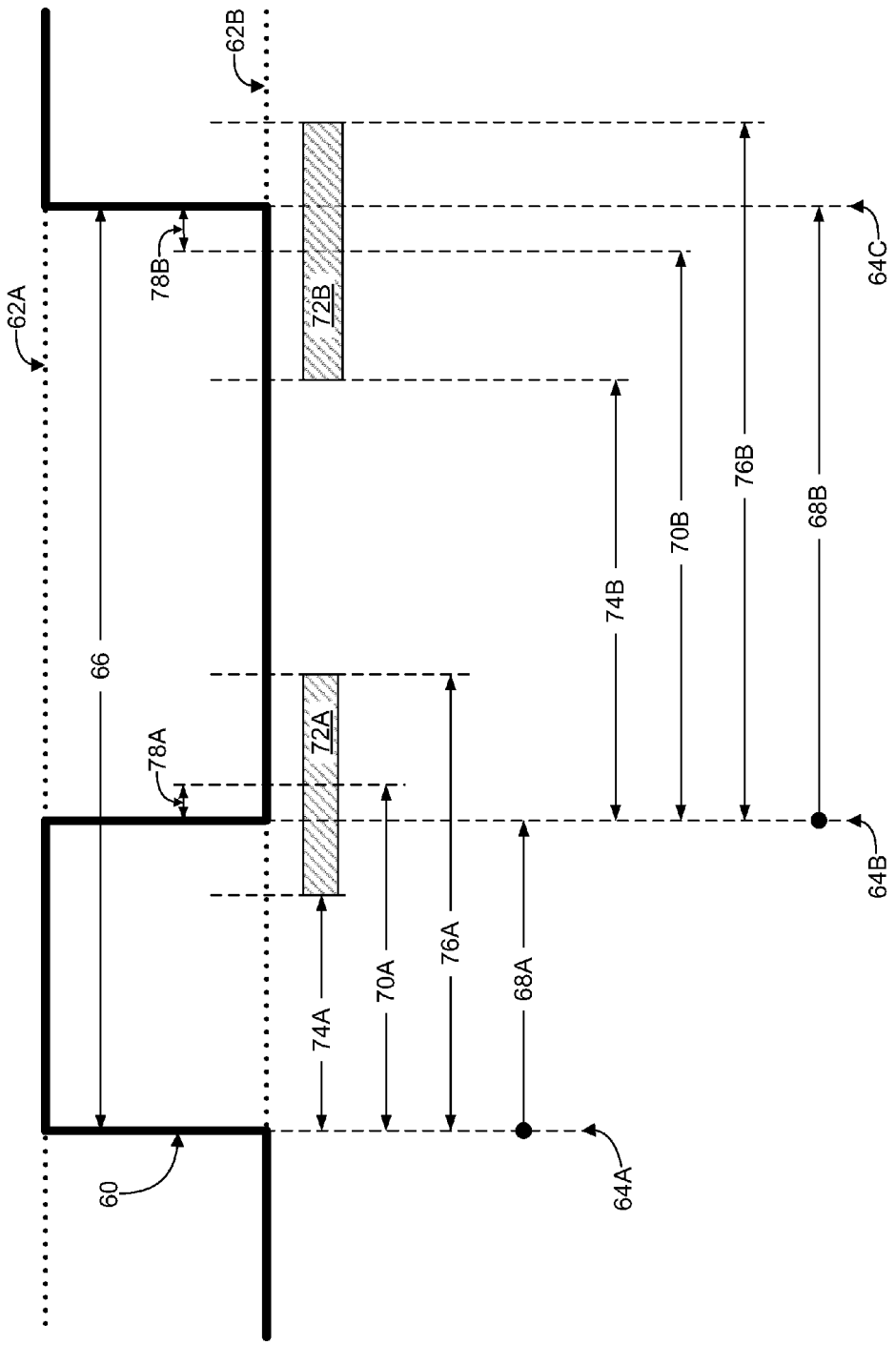
FIG. 5 illustrates an example synchronization signal with example synchronization parameters.

FIG. 5 illustrates an example synchronization signal 60 with example synchronization parameters. Prior to transmission, or communication, of data between active stylus 20 and device 52, active stylus 20 or device 52 may perform a synchronization routine. In the example of FIG. 5, synchronization signal 60 may represent a signal transmitted by device 52 as received by active stylus 20. In particular embodiments, a synchronization routine may include active stylus 20 receiving a synchronization signal 60 from device 52 and determining, or learning, one or more synchronization parameters from synchronization signal 60. In particular embodiments, synchronization parameters may include particular characteristics of synchronization signal 60, such as for example data rate, frequency, signal level, jitter, period, duty cycle, pulse duration, timing, or phase. In particular embodiments, data rate or frequency may refer to a rate at which data or a signal is transmitted and may have units of hertz (Hz) or bits/s. In particular embodiments, the timing or phase of a signal may refer to one or more locations with respect to time where one or more features (e.g., edges or pulses) of a signal occur. In particular embodiments, the timing of a signal may be determined from a measurement of one or more times where one or more edges of a signal occur, and the timing of a signal, along with a signal's period or data rate, may be used to estimate times where subsequent edges may be expected to occur. In particular embodiments, after active stylus 20 learns particular synchronization parameters, active stylus 20 may then be synchronized with device 52, and active stylus 20 and device 52 may communicate by sending or receiving data in a manner consistent with synchronization parameters. In particular embodiments, a data signal sent by active stylus 20 or device 52 may have characteristics that are similar to or related to characteristics of synchronization signal 60. As an example and not by way of limitation, after active stylus 20 determines a data rate and timing (or phase) of synchronization signal 60, active stylus 20 may transmit a signal to device 52 by performing charge removal or charge addition to electrodes of touch sensor 10 at a data rate or phase approximately the same as synchronization signal 60. As an example and not by way of limitation, active stylus 20 may transmit a signal to or receive a signal from device 52 at a data rate approximately the same as synchronization signal 60 and at a timing approximately equal to the timing of synchronization signal 60 plus a predetermined offset.

In the example of FIG. 5, the horizontal axis may represent time, and the vertical axis may represent an amplitude of a characteristic of synchronization signal 60, such as for example an amplitude of a voltage, electric field, current, or power of synchronization signal 60 as received by active stylus 20. In particular embodiments, synchronization signal 60 may include digital logic with a series of two-level symbols or a series of multi-level symbols (e.g., three-level logic). In the example of FIG. 5, synchronization signal 60 may include a two-level digital-logic signal with a periodic series of digital-high 62A and digital-low 62B levels. In a two-level logic scheme, digital high 62A and digital low 62B may be referred to, respectively, as "one and zero," "on and off," "pulse and off," or "mark and space." As illustrated in FIG. 5, a transition from a digital low 62B to a digital high 62A in synchronization signal 60 may be indicated by a rising, or positive, edge occurring at time 64A, and a transition from a digital high 62A to a digital low 62B may be indicated by a falling, or negative, edge occurring at time 64B. In particular embodiments, a synchronization routine may include detection of positive or negative edges of synchronization signal 60 and determining a time or a counter value where an edge occurs.

In particular embodiments, data may be transmitted at a particular frequency, or data rate, where a data rate may be in a range of approximately 10 kHz to 10 MHz (or, 10 kilobits/s to 10 megabits/s). The period 66 of a data rate may be defined as the inverse of the data rate, and a single period 66 may be referred to as a time interval for a single cycle of data. As an example and not by way of limitation, a data rate of 100 kHz has a corresponding period of 1/(100 kHz), or 10 µs. In particular embodiments, period 66 may be approximately equal to a time interval between two successive positive or negative edges. In FIG. 5, period 66 of synchronization signal 60 is illustrated as a time interval between two successive positive edges. In particular embodiments, data may have a 50%, 25%, or 75% duty cycle, or any other suitable duty cycle, where duty cycle may be a ratio between a pulse duration, or "on" duration, and a period of a signal. In the example of FIG. 5, pulse duration 68A may be illustrated as a time interval between time 64A (occurring at a rising edge) and time 64B (occurring at a subsequent falling edge). In FIG. 5, duty cycle is approximately 33% and may be approximately equal to pulse duration 68A divided by period 66. Although this disclosure describes and illustrates particular signals or data having particular data rates, periods, duty cycles, and data schemes (e.g., two-level logic, three-level logic, etc.), this disclosure contemplates any suitable signals or data having any suitable data rates, periods, duty cycles, and data schemes.

As illustrated in FIG. 5, a synchronization routine to determine one or more synchronization parameters may include one or more timers or counters 68 and one or more windows 72 associated with counters 68. In particular embodiments, a timer or counter 68 may include a digital counter that may count in terms of clock cycles, and counter 68 may increment by one count for each clock cycle. In particular embodiments, counter 68 may count clock cycles of a clock that resides in a processor of controller 50. In particular embodiments, one or more registers or memory locations may be associated with one or more counters 68, and a register may be used for storing a particular counter value. In particular embodiments, one or more clocks, counters 68, windows 72, registers, or arithmetic circuitry or logic associated with clocks, counters 68, windows 72, or registers may reside in controller 50 of active stylus 20. Although this disclosure describes and illustrates particular clocks, counters 68, and registers for measuring particular intervals between events in particular synchronization signals 60, this disclosure contemplates any suitable combination of one or more suitable clocks, counters 68, and registers suitably configured to measure any suitable intervals in any suitable synchronization signal 60.

In particular embodiments, a counter 68 may be used to measure one or more time intervals between one or more edges of synchronization signal 60. As an example and not by way of limitation, a counter 68 may be initialized to a value of zero and then, when triggered by an edge of synchronization signal 60, counter 68 may begin to accumulate clock-cycle counts. When triggered by another subsequent edge of synchronization signal 60, counter 68 may cease accumulating clock-cycle counts, and a value of counter 68 may indicate a time interval corresponding to a time between two particular events or edges of synchronization signal 60. In particular embodiments, a value of counter 68 indicating a time interval between two edges may be stored in a register, and counter 68 may be reinitialized to zero and used for timing another event interval. In particular embodiments, a counter 68 may accumulate clock-cycle counts continuously, and a time interval between events may be determined by storing an initial counter 68 value in a register and later storing an end counter 68 value in another register. In particular embodiments, an event interval may be determined by subtracting an initial counter value from an end counter value. In particular embodiments, a synchronization routine may include a single counter 68 to determine one or more timing intervals between particular edges of synchronization signal 60. In particular embodiments, a synchronization routine may include two or more counters 68 to determine one or more timing intervals between particular edges of synchronization signal 60. In particular embodiments, a synchronization routine may include one or more registers and arithmetic circuitry or logic to determine one or more timing intervals between particular edges of synchronization signal 60.

In particular embodiments, a counter 68 may begin accumulating counts when triggered by an event associated with a rising or falling edge of synchronization signal 60. For example, in FIG. 5, a positive edge of synchronization signal 60 may occur at time 64A and a synchronization routine may initiate counter 68A with associated window 72A, and a negative edge of synchronization signal 60 may occur at time 64B and a synchronization routine may initiate counter 68B with associated window 72B. In particular embodiments, when triggered by an event associated with an edge of synchronization signal 60, a synchronization routine may cause a counter 68 to cease accumulating counts or a register to store a counter's value. For example, in FIG. 5, a negative edge of synchronization signal 60 at time 64B may cause counter 68A to cease counting or have its value stored in a register, and a positive edge of synchronization signal 60 at time 64C may cause counter 68B to cease counting or have its value stored in a register. In the example of FIG. 5, a duration or width of a pulse may be determined by a value of counter 68A, by a value of a register associated with counter 68A, or by a difference in values of two registers associated with an initial count and an end count of counter 68A. In FIG. 5, a duration of time between edges or pulses may be determined similarly by a value of counter 68B or one or more registers associated with counter 68B. In FIG. 5, period 66 may be determined from a sum of counters 68A and 68B or by a sum of registers associated with counters 68A and 68B. In particular embodiments, period 66 may be determined by configuring one or more counters to determine an interval between two successive positive edges or two successive negative edges of synchronization signal 60.

In particular embodiments, a counter 68 may have a window 72 associated with it, and each window 72 may be characterized by a begin-point 74, an end-point 76, an expected edge-point 70, or a window span or interval. In particular embodiments, a span or interval of window 72 may be determined by a difference between end-point 76 and begin-point 74. In particular embodiments, window 72 may be a predetermined window (or interval or span) of time that is located a predetermined amount of time after a time 64 when a counter 68 is initialized. For example, in FIG. 5, window 72A may be associated with timer 68A, and, relative to time 64A, window 72A has begin-point 74A, end-point 76A, and expected edge-point 70A. In the example of FIG. 5, counter 68A may be initiated by a rising edge of synchronization signal 60 occurring at time 64A, and window 72A indicates a range of time within which a falling edge may be expected by a synchronization routine. In FIG. 5, expected edge-point 70A indicates a particular time at which a synchronization routine may expect a falling edge to occur, and begin-point 74A and end-point 76A indicate limits or a span of window 72A within which a falling edge may be expected. Similarly, in the example of FIG. 5, window 72B may be associated with timer 68B, and, relative to time 64B, window 72B has begin-point 74B, end-point 76B, and expected edge-point 70B. In FIG. 5, counter 68B may be initiated by a falling edge of synchronization signal 60 occurring at time 64B, and window 72B indicates a range of time within which a rising edge may be expected by a synchronization routine. In FIG. 5, expected edge-point 70B indicates a particular time at which a synchronization routine may expect a rising edge to occur, and begin-point 74B and end-point 76B indicate limits of a span of window 72B. In particular embodiments, windows 72A and 72B may have approximately the same span or duration. In particular embodiments, windows 72A and 72B may have different durations.

In the example of FIG. 5, when counter 68A is initiated at time 64A, counter 68A may be reset to an initial value of zero, and window 72A may have a span or duration of 80 counts that begins at 100 counts (time 74A) and ends at 180 counts (time 76A), relative to initial time 64A. In the example of FIG. 5, expected edge-point 70A may have a value of 140 counts and may be located approximately centered within window 72A, approximately equidistant from begin-point 74A and end-point 76A. In particular embodiments, expected edge-point 70 may be approximately centered within window 72 with begin-point 74 and end-point 76 located approximately equidistant from expected edge-point 70. In particular embodiments, expected edge-point 70 may be positioned at some point within window 72, and window 72 may be located off-center with respect to expected edge-point 70.

In the example of FIG. 5, a synchronization routine may determine whether a falling edge of synchronization signal 60 occurs within a span of window 72A. In particular embodiments, if a falling edge is observed at some time within an 80-count span of window 72A, then a synchronization routine may declare a valid falling edge of synchronization signal 60 or may declare that synchronization signal 60 is valid. In particular embodiments, if no falling edge occurs within the duration of window 72, then, when counter 68 reaches the end of window 72 at time 76, a synchronization routine may determine that a portion of synchronization signal 60 received and analyzed by synchronization routine is not valid. In particular embodiments, if no falling edge occurs within window 72, then a synchronization routine may stop or discard counter 68 and associated window 72 and begin a new search for a subsequent edge in synchronization signal 60. In particular embodiments, discarding a counter 68 or a window 72 may include freeing up the counter 68 for use in monitoring another edge or freeing up one or more registers associated with a value of the counter 68 or the window 72. In FIG. 5, a falling edge of synchronization signal 60 occurs at time 64B with a count of approximately 130 which falls within the duration of window 72A and may indicate a valid falling edge of synchronization signal 60. At this point, a synchronization routine may declare valid rising and falling edges of synchronization signal 60 at times 64A and 64B, respectively, and a synchronization routine may initiate counter 68B at time 64B to look for a positive edge. In the example of FIG. 5, counter 68B is associated with window 72B, and a synchronization routine may determine whether a positive edge of synchronization signal 60 occurs within a span of window 72B. In FIG. 5, a positive edge of synchronization signal 60 occurs at time 64C which is located within the span of window 72B. In particular embodiments, if a counter value 68 associated with an edge is determined to be greater than begin-point 74 and less than end-point 76 of window 72 associated with counter 68, then it may be determined that an edge associated with counter value 68 occurred within the span of window 72, and the edge may be determined to be valid.

In particular embodiments, synchronization signal 60 may contain jitter that may cause data rate, duty cycle, phase, or pulse duration to vary from one cycle to another, and active stylus 20 may perform a synchronization routine in the presence of such data jitter. Sources of jitter may include but are not limited to variation of a frequency or phase of a clock as well as noise that may be picked up by synchronization signal 60. As an example and not by way of limitation, a synchronization signal 60 with a nominal data rate of 50 kHz may include jitter that may cause the data rate to vary between approximately 48 kHz and 52 kHz. In the example of FIG. 5, expected edge-point 70A may represent a time point within window 72A where a synchronization routine may expect synchronization signal 60 to exhibit a negative edge. In FIG. 5, a negative edge occurs at time 64B which may be different from expected edge-point 70A, and the two times may differ by edge offset 78A. In particular embodiments, an edge offset 78 may represent a time difference between an expected edge-point 70 and an observed edge point 64. In particular embodiments, an edge offset 78 may be caused in part by jitter of synchronization signal 60.

In FIG. 5, a negative edge occurs at time 64B with a counter value 68A of approximately 130, and expected edge-point 70A may have a value of 140 counts. In FIG. 5, the value of edge offset 78A is about 10 counts, or the difference between expected edge-point 70A and counter value 68A. In particular embodiments, a synchronization routine may update its value of expected edge-point 70 for a subsequent edge search based on a value of edge time 64, counter value 68, or edge offset 78. In FIG. 5, a synchronization routine may change a value of expected edge-point 70 from 140 counts to 130 counts and apply this updated expected edge-point 70 value to a subsequent edge search. In particular embodiments, a synchronization routine may accumulate or average two or more edge times 64, counter values 68, or edge offsets 78 and use these accumulated values to determine a value of an expected edge-point 70 for a subsequent edge search. In particular embodiments, a synchronization routine may update its value of begin-point 74 or end point 76 based on one or more accumulated values or a measure of a variation of one or more edge times 64, counter values 68, or edge offsets 78. As an example and not by way of limitation, for a sequence of one or more edge measurements, a synchronization routine may determine an average value of edge time 64 or counter value 68 to be 135 counts with a maximum edge offset 78 of 7 counts, and for a subsequent edge measurement, a synchronization routine may set expected edge-point 70 to a value of 135 counts, window begin-point 74 to a value of 128 (=135−7) counts, and window end-point 76 to a value of 142 (=135+7) counts. In particular embodiments, a synchronization routine may use any suitable technique for accumulating or determining an average or a variation of values of edge time 64, counter value 68, or edge offset 78 including but not limited to performing an average, median, maximum, standard deviation, or other suitable arithmetic operation, or any suitable combination of such techniques. Although this disclosure describes and illustrates particular synchronization routines being performed to determine particular synchronization parameters of signals having particular jitter characteristics, this disclosure contemplates any suitable synchronization routine for determining any suitable synchronization parameters of signals having any suitable jitter characteristics.

Figure 6:
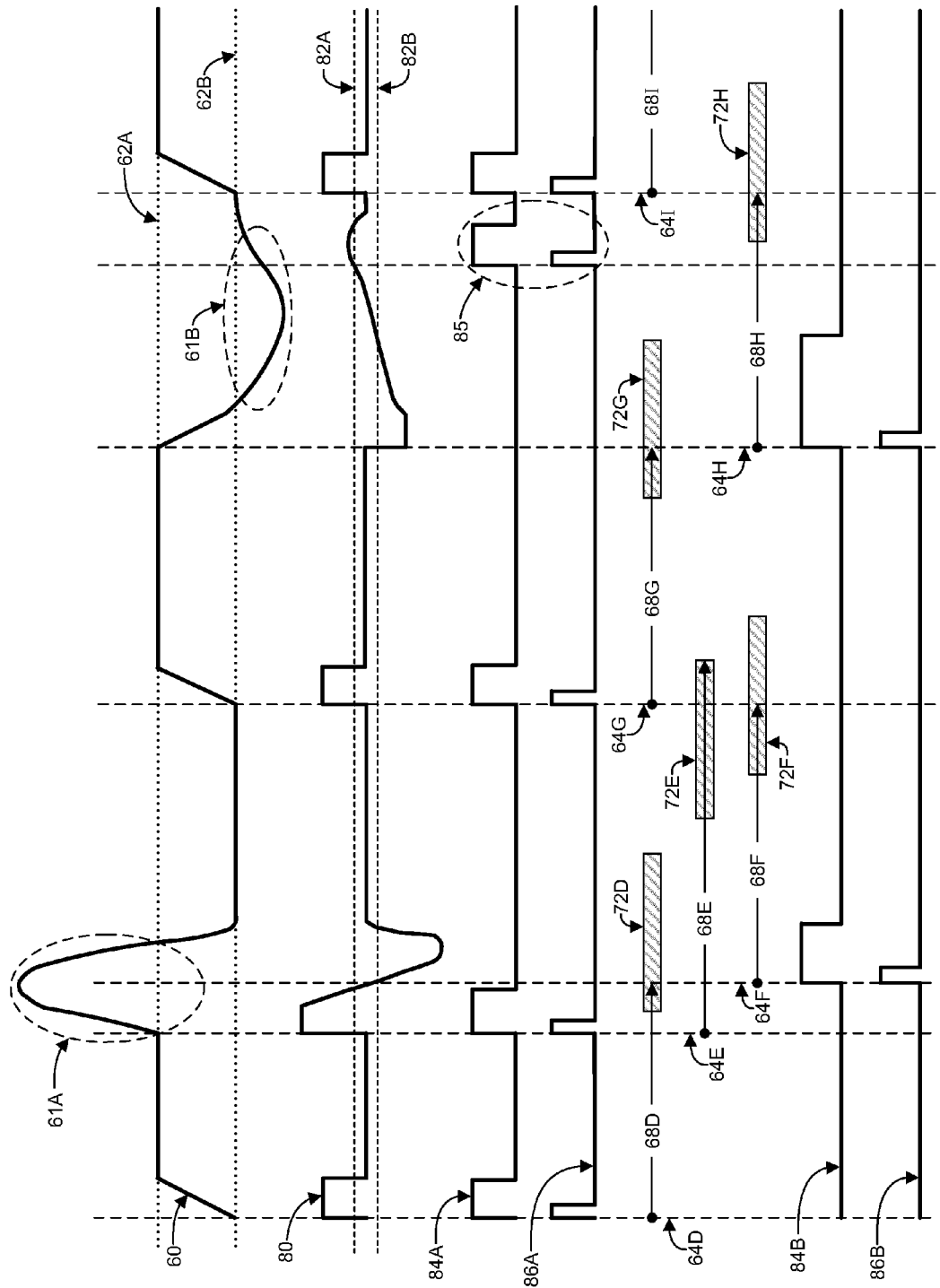
FIG. 6 illustrates an example timing diagram with example signals received and processed by an example active stylus.

FIG. 6 illustrates an example timing diagram with example signals received and processed by an example active stylus 20. In particular embodiments, signals may include data transmitted from device 52 to active stylus 20, data transmitted from active stylus 20 to device 52, or data processed by active stylus 20. In particular embodiments, synchronization signal 60 sent from device 52 and received by active stylus 20 may include a square wave with a periodic sequence of digital pulses at a particular data rate and duty cycle.

In particular embodiments, active stylus 20 may perform a synchronization routine in the presence of noise, as shown in the example synchronization signal 60 of FIG. 6. In particular embodiments, synchronization signal 60 received by active stylus 20 may include a square-wave portion along with a noise portion, where various sources of noise, as discussed above, may be introduced into synchronization signal 60 as received by active stylus 20. In the example of FIG. 6, synchronization signal 60 may be considered as a combination of a periodic, digital signal with signal levels 62A and 62B corresponding to digital high and digital low, respectively, along with one or more noise features or spikes that may distort synchronization signal 60. For example, synchronization signal 60 has a positive noise spike 61A that occurs where a falling edge of the first pulse of synchronization signal 60 might be expected and a negative noise feature 61B occurring between the second and third pulses of synchronization signal 60, where a low or zero level might be expected.

In particular embodiments, active stylus 20 may perform a synchronization routine over a limited number of cycles of data. As an example and not by way of limitation, active stylus 20 may determine synchronization parameters over a period of approximately one-half to five data cycles, and after such a synchronization period, active stylus 20 may then be synchronized to device 52. In particular embodiments, once active stylus 20 is synchronized, active stylus 20 may begin to transmit data to and receive data from device 52. Although this disclosure describes and illustrates particular synchronization routines being performed to determine particular synchronization parameters over a particular number of cycles of signals having particular noise characteristics, this disclosure contemplates determining any suitable synchronization parameters of signals having any suitable noise characteristics over any suitable number of cycles.

In the example of FIG. 6, synchronization signal 60 may represent a voltage signal received at an electrode of active stylus 20, and sensed signal 80 may represent a current into sense unit of active stylus 20 resulting from receipt of synchronization signal 60. In particular embodiments, sensed signal 80 may be proportional to a first derivative with respect to time of synchronization signal 60, and the relationship between the two signals may be expressed as $$i = C \times \frac{dV}{dt},$$

where i is the current of sensed signal 80 produced by V, synchronization signal 60, and C is the capacitance of one or more electrodes of active stylus 20 where synchronization signal 60 is received. In particular embodiments, active stylus 20 may convert sensed signal 80 into a voltage signal that is proportional to sensed signal 80. As an example and not by way of limitation, sensed signal 80 may be passed through an electronic gain stage, buffer stage, or transimpedance amplifier stage that may produce an output voltage signal proportional to sensed signal 80. In particular embodiments, sensed signal 80 may be passed through a filter to remove particular unwanted high-frequency noise or transients from sensed signal 80. In the example of FIG. 6, the edges of synchronization signal 60 may be associated with peaks of sensed signal 80 as a result of the derivative relationship between the two signals. As an example, a rising edge of synchronization signal 60 may be associated with a positive pulse in sensed signal 80, and a falling edge of synchronization signal 60 may be associated with a negative pulse in sensed signal 80.

In particular embodiments, a synchronization routine may include detecting positive or negative edges of synchronization signal 60. In particular embodiments, edges of synchronization signal 60 may be determined by detecting peaks of an associated sensed signal 80. As an example and not by way of limitation, peaks of sensed signal 80 may be detected with a comparator circuit where sensed signal 80 is compared to a reference voltage or current. In particular embodiments, when sensed signal 80 makes a transition that crosses a reference value, a comparator circuit's output may switch from low to high or from high to low. In the example of FIG. 6, positive comparator signal 84A may represent a signal obtained after passing sensed signal 80 through a positive comparator circuit with a positive reference value 82A. Similarly, in FIG. 6, negative comparator signal 84B may represent a signal obtained after passing sensed signal 80 through a negative comparator circuit with a negative reference value 82B. In particular embodiments, each peak or pulse of positive comparator signal 84A may correspond to a positive peak of sensed signal 80, which in turn may correspond to a positive (or rising) edge of synchronization signal 60. Similarly, in particular embodiments, each peak or pulse of negative comparator signal 84B may correspond to a negative peak of sensed signal 80, which in turn may correspond to a negative (or falling) edge of synchronization signal 60.

In particular embodiments, a comparator used for detecting peaks of sensed signal 80 may be an analog comparator, including, for example, an operational amplifier (op-amp), with sensed signal 80 connected to one input of the op-amp, and a reference voltage supplying the other input to the op-amp. In other embodiments, one or more other suitable analog comparators may be employed. In particular embodiments, one or more comparators used for detecting peaks of sensed signal 80 may be digital comparators, including, for example, a dedicated voltage comparator chip. In particular embodiments, one or more comparators may reside in the sense unit of controller 50. In particular embodiments, one or more comparators may reside in controller 50. Although this disclosure describes particular comparators located in particular parts of active stylus 20, this disclosure contemplates any suitable comparators having any suitable location within active stylus 20.

In particular embodiments, comparator signal 84 may be sent through an edge-detector circuit to produce edge-detector signal 86. For each rising edge in comparator signal 84, an edge-detector circuit may produce a single pulse having a particular pulse duration. In particular embodiments, an edge-detector circuit may include digital-logic circuitry, such as for example a series of flip-flops and logic gates. As an example and not by way of limitation, an edge-detector circuit may include two or more flip-flops that synchronize the asynchronous output from the comparator to the clock domain of the digital logic followed by one or more flip-flops and logic gates to indicate falling or rising edges by detecting differences in logic level between consecutive clock cycles. In the example of FIG. 6, positive comparator signal 84A may be sent to an edge-detector circuit to produce positive edge-detector signal 86A, where each pulse of positive edge-detector signal 86A may correspond to a positive edge of synchronization signal 60. Similarly, negative comparator signal 84B may be sent to an edge-detector circuit to produce negative edge-detector signal 86B, where each pulse of negative edge-detector signal 86B may correspond to a negative edge of synchronization signal 60. In particular embodiments, prior to being sent through an edge-detector circuit, comparator signal 84 may first be sent through a filter circuit that may remove or reduce spurious noise or short spikes from comparator signal 84. In particular embodiments, an edge-detector circuit or a filter circuit may reside in controller 50 of active stylus 20. In particular embodiments, an edge-detector circuit or a filter circuit may be part of a sense unit in controller 50. Although this disclosure describes and illustrates particular techniques for detecting edges of a synchronization signal 60, this disclosure contemplates any suitable techniques including analog circuitry, digital circuitry, digital logic, software, or any suitable combination of such techniques for detecting rising or falling edges of a synchronization signal 60.

In particular embodiments, a counter 68 may begin counting when triggered by an event associated with a rising or falling edge of synchronization signal 60, such as for example a pulse or rising edge of comparator signal 84 or of edge-detector signal 86. For example, a rising edge of synchronization signal 60 in FIG. 6 may result in a peak in positive comparator signal 84A and a pulse in edge-detector signal 86A. In the example of FIG. 6, a rising edge of edge-detector signal 86A may occur at time 64D and may initiate counter 68D with window 72D associated with counter 68D. For example, when counter 68D is initiated at time 64D, counter 68D may be assigned an initial value of zero counts, and window 72D may have a span of 150 counts that begins at 200 counts and ends at 350 counts, relative to initial time 64D. A synchronization routine may include looking for an indication that a falling edge of synchronization signal 60 occurs within a span of window 72D. For example, in FIG. 6, a synchronization routine may look for a pulse or rising edge in negative edge-detector signal 86B within window 72D. If a pulse or rising edge in edge-detector signal 86B occurs at some time within a 150-count span of window 72D, then this pulse will be considered a valid indicator of a falling edge of synchronization signal 60. If no pulse or rising edge in edge-detector signal 86B occurs within the span of window 72D, then the synchronization routine may stop or discard counter 68D and associated window 72D and begin a new search for a subsequent pulse or rising edge in edge-detector signal 86. In FIG. 6, a rising edge of edge-detector signal 86B occurs at time 64F which falls within the span of window 72D, indicating a falling edge of synchronization signal 60. At this point, a synchronization routine may declare valid rising and falling edges of synchronization signal 60 at times 64D and 64F, respectively.

In particular embodiments, for a synchronization signal having duty cycle of approximately 50%, a synchronization routine may determine that active stylus 20 is synchronized to device 52 after measuring a valid rising edge followed by a valid falling edge or a valid falling edge followed by a valid rising edge. A 50% duty cycle indicates that a time between sequential rising and falling edges may be approximately the same as a time between sequential falling and rising edges. In particular embodiments, when a synchronization routine knows an approximate value for a duty cycle of synchronization signal 60 prior to initiation of a synchronization routine, synchronization of active stylus 20 may be achieved after measuring a valid rising (or falling) edge followed by a valid falling (or rising) edge. In particular embodiments where synchronization is achieved after observing one valid rising (or falling) edge followed by one valid falling (or rising) edge, a synchronization routine may achieve synchronization in approximately one-half of a data cycle or one-half of a period of synchronization signal 60.

In particular embodiments, once a synchronization routine declares that synchronization has been achieved, a synchronization routine may continue to monitor synchronization signal 60 by looking for rising and falling edges of synchronization signal 60 and determining whether these edges are valid by determining whether they occur within an expected span of a window 72. If a positive (or rising) edge of synchronization signal 60 is expected to occur within a particular window 72 and no such edge is observed, a synchronization routine may declare a loss of synchronization, and a synchronization routine may re-initiate and begin again. Similarly, if a negative (or falling) edge of synchronization signal 60 is expected to occur within a particular window 72 and no such edge is observed, a synchronization routine may declare a loss of synchronization, and a synchronization routine may re-initiate and begin again. If an edge occurs outside a window 72, a synchronization routine may ignore such an edge because it does not occur within the span of a window 72. An edge that occurs outside a window 72 may be caused by noise on synchronization signal 60, and the presence of a window 72 may allow a synchronization routine to discriminate between noise that occurs outside a window 72 and valid edges. If an edge of an incorrect polarity (e.g., a negative edge occurs when a positive edge is expected) occurs within a span of window 72, a synchronization routine may ignore this edge because it is an incorrect polarity. An edge of an incorrect polarity occurring within the span of a window 72 may be caused by noise on synchronization signal 60, and the use of a window 72 in which an edge of a particular polarity is expected may help a synchronization routine to reject or ignore such a false or invalid edge.

In the example of FIG. 6, after a falling edge is observed at time 64F, a synchronization routine may initiate counter 68F, beginning at time 64F and having an associated window 72F. In particular embodiments, such as for example for a synchronization signal having a duty cycle of approximately 50%, window 72F may have a substantially same span and location as for window 72D. As an example, window 72F may have a span of 150 clock-cycle counts and may begin 200 counts after initial time 64F and end 350 counts after initial time 64F. In particular embodiments, window 72F, which may be associated with a time interval between a falling edge and a rising edge of synchronization signal 60, may have a different span or location than window 72D. In particular embodiments, a synchronization routine 60 may use different window spans or locations for windows. As an example and not by way of limitation, for a signal with a duty cycle of approximately 33%, the signal may have a pulse or "on" duration of approximately 150 counts and a duration between pulses of approximately 300 counts. For such an example signal, one window may have a span of 100 clock-cycle counts that may begin 100 counts after an initial time 64 while another window may have a span of 150 clock-cycles that may begin 225 counts after an initial time 64.

In the example of FIG. 6, a second rising edge in synchronization signal 60 associated with noise spike 61A occurs at time 64E and results in pulses in received signal 80, comparator signal 84A, and positive edge-detector signal 86A. In FIG. 6, a rising edge detected at time 64E may cause a synchronization routine to initiate counter 68E with associated window 72E, and a synchronization routine may look for a falling edge to be detected within a span of window 72E. As indicated by comparator signal 84B and negative edge-detector signal 86B in FIG. 6, counter 68E reaches a limit of window 72E, and no falling edge is detected within a span of window 72E. In FIG. 6, a synchronization routine may declare the edge at time 64E to be false or invalid, and the value of counter 68E may be discarded. In the example of FIG. 6, during the time interval of 64E to 64F, the synchronization routine may have two candidate edges under consideration at the same time along with two corresponding counters (e.g., 68E and 68F). In particular embodiments, prior to declaring that synchronization has been achieved, a synchronization routine may simultaneously consider one, two, or any suitable number of candidate edges and may have one, two, or any suitable number of counters running at the same time. In particular embodiments, when a valid falling edge occurs (e.g., at time 64F in FIG. 6), a synchronization routine may declare that synchronization has been achieved, and counter 68E may be stopped or discarded at time 64F before it reaches a limit of window 72E. In particular embodiments, counter 68D may include one counter, and counter 68E may include a second, distinct counter. In particular embodiments, counter values for counter 68D and 68E may be derived from a single counter that may include one or more registers for storing readings from the counter and one or more arithmetic functions for calculating differences in counter readings. In particular embodiments, a synchronization routine may include one, two, or any suitable number of counters, and each counter may monitor one or more edges of synchronization signal 60.

In the example of FIG. 6, a positive edge in synchronization signal 60 is observed at time 64G which falls within the span of window 72F. At this point, a synchronization routine may determine that the positive edge at time 64G is valid, and a synchronization routine may declare that synchronization of active stylus 20 has been achieved. In particular embodiments, a synchronization routine may determine that synchronization has been achieved after observing a series of two valid edges, a series of three valid edges, or a series of any suitable number of valid edges. In particular embodiments, declaring that synchronization has been achieved may include active stylus 20 observing one or more valid edges and determining one or more synchronization parameters of synchronization signal 60, such as for example a period, data rate, signal level, phase, or timing of synchronization signal 60. In particular embodiments, after declaring that synchronization has been achieved, active stylus 20 and device 52 may begin to communicate with each other by transmitting data. In the example of FIG. 6, after determining that three valid edges have occurred at times 64D, 64F, and 64G, a synchronization routine may determine any of these synchronization parameters as follows: the period of synchronization signal 60 is approximately the difference between times 64G and 64D (or the sum of counter values 68D and 68F); the pulse duration is approximately the difference between times 64F and 64D (or counter value 68D); and the phase or timing of synchronization signal may be determined from times 64D, 64F, or 64G or counter values 68D or 68F (e.g., a falling edge may be expected to occur at a time 68D counts after time 64G, and a subsequent rising edge may be expect to occur at a time 68D+68F counts after time 64G). In the example of FIG. 6, after determining one or more synchronization parameters, a synchronization routine may declare that synchronization has been achieved, and a synchronization routine may send a message to controller of active stylus 20 or set or clear a flag indicating that active stylus 20 is synchronized.

In particular embodiments, monitoring a signal from device 52 for edges to determine one or more synchronization parameters may be referred to as an acquisition phase of a synchronization routine. In particular embodiments, a synchronization routine in an acquisition phase may consider more than one candidate for valid edges at the same time. As an example and not by way of limitation, a synchronization routine may consider two positive edges and may initiate a counter for each edge. Then, in particular embodiments, if a negative edge occurs and falls within a span of windows 72 associated with both counters, a synchronization routine may select a positive edge that occurred later to avoid synchronization at a data rate with a period that may be an integral multiple of a period of synchronization signal 60. Similarly, if a synchronization routine has one positive edge under consideration (with an associated counter) and two negative edges occur with a span of window 72 associated with the counter, a synchronization routine may select a negative edge that occurred earlier, also to avoid synchronization at a data rate that differs from a data rate of synchronization signal 60 by an integral multiple.

In particular embodiments, a synchronization routine may continue to operate after synchronization has been achieved by monitoring a signal from device 52 for edges or updating values of one or more synchronization parameters. In particular embodiments, continuing to operate after synchronization has been achieved to monitor a signal for edges and update values of one or more synchronization parameters may be referred to as an adaptation phase. In particular embodiments, once synchronization has been achieved, a synchronization routine may cease to monitor a signal from device 52. In particular embodiments, once synchronization has been achieved, a synchronization routine may operate periodically by alternately monitoring a signal from device 52 for one or more edges or synchronization parameters for a period of time and then ceasing to monitor a signal from device 52 for another period of time. In particular embodiments, after synchronization has been achieved and when a synchronization routine monitors a signal from device 52, if it is determined that an expected edge did not occur within a span of a particular window 72, a synchronization routine may send a message to controller of active stylus 20 or set or clear a flag to indicate that active stylus 20 is not synchronized or has lost synchronization. In particular embodiments, if active stylus 20 loses synchronization, a synchronization routine may return to an acquisition phase by using one or more counters and windows to monitor a synchronization signal 60 for edges and determine one or more synchronization parameters, as described above.

In the example of FIG. 6, active stylus 20 may be synchronized with device 52 at time 64G, and at time 64G a synchronization routine may start counter 68G with associated window 72G. At time 64H, a valid negative edge that falls within the span of window 72G may be observed, and counter 68H with associated window 72H may be initiated. In FIG. 6, noise feature 61B occurs between the second and third pulses of synchronization signal 60, and noise feature 61B may cause a false or invalid indication of a positive edge as illustrated by pulses in region 85 of comparator signal 84A and edge-detector signal 86A. In particular embodiments, a synchronization routine may ignore these pulses since they occur outside the span of window 72H. In FIG. 6, an indication of a valid positive edge occurs at time 64I which falls within the span of window 72H, and a synchronization routine may continue to operate in an adaptation phase by initiating counter 68H.

FIGS. 7A-7B illustrate other example synchronization signals 60 with example synchronization parameters. In particular embodiments, active stylus 20 may not know a data rate or duty cycle of synchronization signal 60 of device 52 in advance, and a synchronization routine may include active stylus 20 determining, or learning, a data rate or duty cycle in real-time while receiving or processing synchronization signal 60. In particular embodiments, initial values or estimates for data rate, duty cycle, expected-edge time, or window span or location may be pre-loaded on active stylus 20 (e.g., in controller 50 or memory 44), and a synchronization routine may begin by using these initial values or estimates. In particular embodiments, prior to a synchronization routine being initiated, a designer or manufacturer of active stylus 20 may interact with active stylus 20 to initialize or configure initial values or estimates for data rate, duty cycle, expected-edge time, or window span or location. In the example of FIG. 7A, two example synchronization signals 60 are shown with synchronization signal 60A having a lower data rate and longer period and synchronization signal 60B having a higher data rate and longer period. In particular embodiments, synchronization signals 60A and 60B may represent an initial range of data rates or periods within which synchronization signal 60 may be expected to operate. As an example and not by way of limitation, synchronization signal 60A may represent a data rate of approximately 30 kHz (or a period of approximately 33 µs), and synchronization signal 60B may represent a data rate of approximately 200 kHz (or a period of approximately 5 µs). In particular embodiments, initial values for window parameters for a window 72, such as for example window begin-point 74, window end-point 76, or expected edge-point 70, may be determined based on an initial range of data rates or periods. In the example of FIG. 7A, initial window parameters for window 72J may be set to approximately 2 µs for window begin-point 74J, 18 µs for window end-point 76J, or 9 µs for expected edge-point 70J.

In particular embodiments, when active stylus 20 is synchronized, a synchronization routine may dynamically adjust synchronization parameters based on one or more measurements of edge times 64. In particular embodiments, synchronization parameters may be adjusted so that window span is reduced, which may reduce sensitivity of a synchronization routine to a false or invalid edge that may occur outside of a span of window 72. In the example of FIG. 7A, initial estimates for window parameters may be approximately 2 µs for window begin-point 74J, 18 µs for window end-point 76J, or 9 µs for expected edge-point 70J. In FIG. 7A, the span of window 72J is approximately 16 µs (=18 µs−2 µs). In particular embodiments, after a synchronization routine has determined one or more window parameters from synchronization signal 60, window parameters may be modified based on measurements of edges of synchronization signal 60. In the example of FIG. 7B, synchronization signal 60C may represent a received signal, and after observing one or more edges of synchronization signal 60C, a synchronization routine may modify estimates for window parameters to approximately 3.1 μs for window begin-point 74K, 4.1 μs for window end-point 76K, or 3.6 μs for expected edge-point 70K. In the example of FIGS. 7A-7B, window span may be reduced from an initial estimate of approximately 16 μs to approximately 1 μs (=4.1 μs–3.1 μs). Although this disclosure describes and illustrates particular estimates or adjustments to particular synchronization parameters, this disclosure contemplates any suitable estimates or adjustments to any suitable synchronization parameters.

Figure 8:
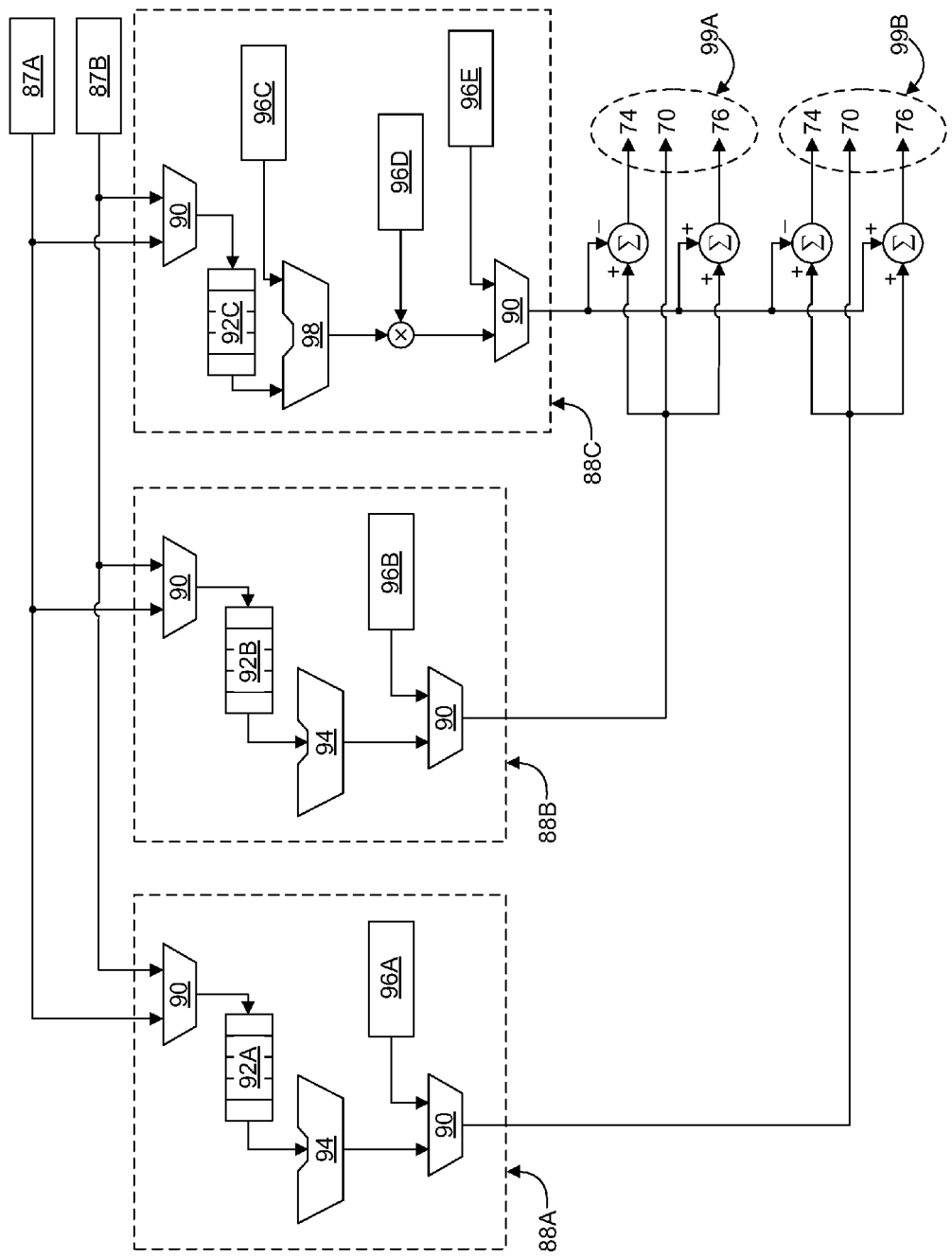
FIG. 8 illustrates an example block diagram of a routine for estimating one or more window parameters.

FIG. 8 illustrates an example block diagram of a routine for estimating one or more window parameters. The example block diagram in FIG. 8 may be implemented in hardware circuitry, in software or logic, or any suitable combination of hardware and software. In the example of FIG. 8, input values or signals 87 may represent one or more time measurements or a value of one or more registers that contain time measurements of synchronization signal 60. In particular embodiments, value 87A may be a counter value 68 associated with a rising edge followed by a falling edge of synchronization signal 60, and value 87B may be a counter value 68 associated with a falling edge followed by a rising edge of synchronization signal 60. As an example and not by way of limitation, value 87A may be counter value 68A from FIG. 5, and value 87B may be counter value 68B from FIG. 5. Modules 88A-C may represent various computations that may be performed with input values 87 to generate output values 99. In particular embodiments, output values 99 may represent estimated values for one or more synchronization parameters. In particular embodiments, output values 99 may include estimates for expected edge-point 70, window begin-point 74, or window end-point 76.

In FIG. 8, modules 88A and 88B may represent estimators for expected positive or negative edge-points 70. In particular embodiments, modules 88A and 88B may have substantially the same functionality. In module 88A, input values 87 may feed into multiplexer 90 which may select one of the input values and send it to a register or storage array 92A. Storage array 92A may store one or more previous input values 87 and may send these values to an averaging filter 94. Averaging filter 94 may generate an output that is an average, median, maximum, or any suitable function of the one or more values of storage array 92A. As an example and not by way of limitation, storage array 92A may store the last five input values 87, and averaging filter 94 may select a median value from these five values. In particular embodiments, storage array 92A may store an even number of values, and averaging filter 94 may select a median value by first removing one value (e.g., a maximum value, a minimum value, or a most-recent value) from storage array 92A and then selecting a median value from a remaining odd number of values. In particular embodiments, when a routine represented by FIG. 8 begins to operate, storage array 92A may not be populated with values, and module 88A may use a multiplexer 90 to select an initial value from register 96A. In particular embodiments, register 96A may represent an initial or beginning estimate for an expected edge-point 70. In particular embodiments, module 88A may determine an estimated value for an expected negative edge-point 70, and module 88B may determine an estimated value for an expected positive edge-point 70.

In FIG. 8, module 88C may represent one or more estimators related to a span or duration of a window 72. Module 88C may receive input values and store one or more of them in storage array 92C. Register 96C may represent a value related to an initial or a minimum window size. When a routine represented by FIG. 8 begins to operate, storage array 92C may not be populated with values, and a value from register 96C may be used to set an initial window size. Filter 98 may generate an output that is an average variation, maximum variation, or any suitable measure of variation of the one or more values of storage array 92C and register 96C. In particular embodiments, filter 98 may compute a maximum variation of values of storage array and then select the maximum of that value and a value from register 96C. In FIG. 8, the output of filter 98 may be multiplied by a scaling factor stored in register 96D. In particular embodiments, scaling factor 96D may be a value greater than one that may add extra margin to window sizes. As an example and not by way of limitation, scaling factor 96D may be 1.125, and multiplying an output of filter 98 by 1.125 may add approximately 12.5% extra margin to an estimated window size. In particular embodiments, a scaling factor 96D with a decimal part that includes a factor of two (e.g., $0.125=1/2^3$) may allow the multiplication operation to be implemented with a shift operation and an addition, rather than with multiplier circuitry which can consume excessive area on a chip. In FIG. 8, register value 96E may represent an initial window size. In particular embodiments, an output value from module 88C may be added to and subtracted from an expected edge-point 70 value from module 88A or 88B to produce a window begin-point 74 and a window end-point 76, respectively. In FIG. 8, output values 99A may include estimates for an expected negative edge-point 70 and a begin-point 74 or end-point 76 of an associated window 72. In FIG. 8, output values 99B may include estimates for an expected positive edge-point 70 and a begin-point 74 or end-point 76 of an associated window 72.

In particular embodiments, a routine for estimating one or more window parameters may use inputs from one, two, or any suitable number of suitable input time measurements of a synchronization signal 60. In particular embodiments, a routine as illustrated in FIG. 8 may operate continuously or periodically to supply updated estimates of synchronization parameters or window parameters to a synchronization routine. Although this disclosure describes and illustrates particular routines having particular structures for estimating one or more window parameters, this disclosure contemplates any suitable routine that includes any suitable structures for estimating one or more window parameters.

In particular embodiments, when active stylus 20 is synchronized to device 52, active stylus 20 may transmit data to or receive data from device 52 using estimated window parameters (e.g., window span or location) obtained during an acquisition phase of a synchronization routine. In particular embodiments, a synchronization routine may operate continuously or periodically after an acquisition phase, and a synchronization routine may supply updated estimates of one or more window parameters to be used in the transmission or receipt of data by active stylus 20. In particular embodiments, to avoid drift or walk-off between synchronization parameters and a received signal, a synchronization routine may use one or more measured edge-point 70 values of a received signal to update an expected edge-point 70 value for a subsequent measurement or receipt of a signal. In particular embodiments, a synchronization routine as described above may operate continuously or periodically while data is being received by active stylus 20 to dynamically update synchronization parameters and ensure that device 52 and active stylus 20 remain synchronized. In particular embodiments, if active stylus 20 determines that device 52 and active stylus 20 are no longer synchronized, active stylus 20 may re-initiate a synchronization routine as described above.

Figure 9:
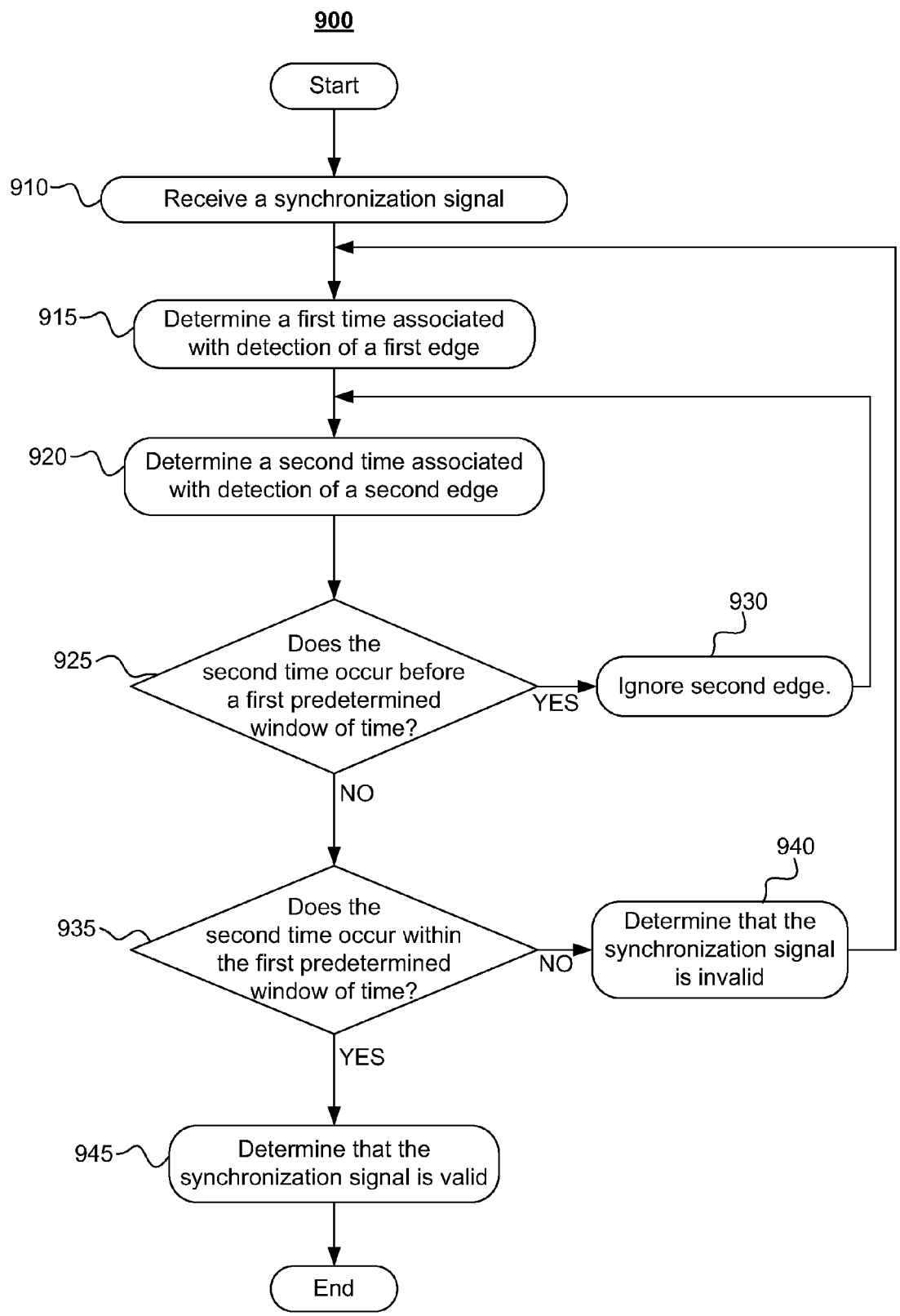
FIG. 9 illustrates an example method for determining whether a synchronization signal is valid.

FIG. 9 illustrates an example method for determining whether a synchronization signal is valid. The method may start at step 910 where a synchronization signal may be received. In particular embodiments, the synchronization signal may be received by a first computing device, such as for example an active stylus, and the synchronization signal may be sent by a second computing device, such as for example a tablet computer. At step 915, a first time associated with detection of a first edge of the synchronization signal may be determined. At step 920, a second time associated with detection of a second edge of the synchronization signal may be determined. In particular embodiments, the first edge may be a positive edge, and the second edge may be a negative edge. At step 925, the method may determine whether the second time occurs before a first predetermined window of time from the first time. If the second time occurs before the first predetermined window of time from the first time, then the method may proceed to step 930. At step 930, the method may ignore the second edge, and the method may proceed back to step 920 to look for another edge. At step 935, the method may determine whether the second time occurs within the first predetermined window of time from the first time. If the second time does not occur within the first predetermined window of time from the first time, then the method may proceed to step 940 where it may be determined that the synchronization signal is invalid, and the method may proceed back to step 915 to look for another edge. If the second time occurs within the first predetermined window of time from the first time, then the method may proceed to step 945 where it may be determined that the synchronization signal is valid, at which point the method may end.

Particular embodiments may repeat the steps of the method of FIG. 9, where appropriate. Moreover, although this disclosure describes and illustrates particular steps of the method of FIG. 9 as occurring in a particular order, this disclosure contemplates any suitable steps of the method of FIG. 9 occurring in any suitable order. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a first computing device, receiving a synchronization signal from a second computing device;
    by the first computing device, determining a first time associated with detection of a first edge of the synchronization signal;
    by the first computing device, determining a second time associated with detection of a second edge of the synchronization signal;
    by the first computing device, determining whether the second time occurs within a first predetermined window of time from the first time;
    by the first computing device, determining a third time associated with detection of a third edge of the synchronization signal;
    by the first computing device, determining whether the third time occurs within a second predetermined window of time from the second time; and
    by the first computing device, if the second time occurs within the first predetermined window of time from the first time, and if third time occurs within the second predetermined window of time from the second time, then:
        determining that the synchronization signal is valid;
        determining a data rate or a timing of the synchronization signal based on the first and second times or the first and third times; and
        indicating that the first computing device is synchronized to the second computing device.

2. The method of claim 1, further comprising:
    by the first computing device, if the second time occurs after the first time and before the first predetermined window of time from the first time, then ignoring the second edge;
    by the first computing device, determining a fourth time associated with detection of a fourth edge of the synchronization signal; and
    by the first computing device, determining whether the fourth time occurs within the first predetermined window of time from the first time.

3. The method of claim 1, wherein:
    the first computing device is a stylus that comprises one or more electrodes for transmitting signals wirelessly to the second computing device through a touch sensor of the second computing device; and the second computing device is a tablet computer.

4. The method of claim 1, wherein:

the first edge is a positive edge;

the second edge is a negative edge; and the method further comprises:

by the first computing device, determining a fourth time associated with detection of a fourth edge of the synchronization signal, wherein the fourth time occurs after the first time and before the second time, and the fourth edge is another positive edge;

by the first computing device, initiating a counter that starts at the fourth time and associating a third predetermined window of time with the counter; and by the first computing device, if the second time occurs within the first predetermined window of time from the first time, then discarding the counter and the third window.

5. The method of claim 1, wherein the synchronization signal comprises a two-level digital signal having a duty cycle of approximately 50%.

6. The method of claim 1, further comprising:

by the first computing device, determining estimated values for an expected edge-point, a window begin-point, and a window end-point based at least in part on the first, second, and third times; and by the first computing device, applying one or more of the estimated values to a detection of a subsequent edge of the synchronization signal.

7. The method of claim 1, further comprising, by the first computing device, sending data to the second computing device at another data rate that is based on the data rate of the synchronization signal and at another timing that is based on the timing of the synchronization signal plus a predetermined offset.

8. The method of claim 1, further comprising:

by the first computing device, receiving data from the second computing device at another data rate and another timing that are based, respectively, on the data rate and the timing of the synchronization signal;

by the first computing device, determining estimated values for an expected edge-point, a window begin-point, and a window end-point of the received data; and by the first computing device, applying one or more of the estimated values to a determination of one or more subsequent edges of data received from the second computing device.

9. The method of claim 1, wherein the synchronization signal comprises a periodic signal with a frequency of approximately 10 kHz to 10 MHz.

10. The method of claim 1, wherein:

the synchronization signal comprises a period that is approximately equal to an inverse of the data rate of the synchronization signal; and the method further comprises, by the first computing device, synchronizing the first computing device to the second computing device within a time period of between one-half and five periods of the synchronization signal.

11. A stylus comprising:

one or more electrodes disposed in a tip of the stylus, the stylus being operable to wirelessly transmit signals to and receive signals from a device; and a computer-readable non-transitory storage medium embodying logic that is configured when executed to:

receive a synchronization signal from the device;

determine a first time associated with detection of a first edge of the synchronization signal;

determine a second time associated with detection of a second edge of the synchronization signal;

determine whether the second time occurs within a first predetermined window of time from the first time;

determine a third time associated with detection of a third edge of the synchronization signal;

determine whether the third time occurs within a second predetermined window of time from the second time and if the second time occurs within the first predetermined window of time from the first time, and if third time occurs within the second predetermined window of time from the second time, then:

determine that the synchronization signal is valid;

determine a data rate or a timing of the synchronization signal based on the first and second times or the first and third times; and indicate that the stylus is synchronized to the device.

12. The stylus of claim 11, wherein the logic is further configured to:

if the second time occurs after the first time and before the first predetermined window of time from the first time, then ignore the second edge;

determine a fourth time associated with detection of a fourth edge of the synchronization signal; and determine whether the fourth time occurs within the first predetermined window of time from the first time.

13. The stylus of claim 11, wherein:

the first edge is a positive edge;

the second edge is a negative edge; and the logic is further configured to:

determine a fourth time associated with detection of a fourth edge of the synchronization signal, wherein the fourth time occurs after the first time and before the second time, and the fourth edge is another positive edge;

initiate a counter that starts at the fourth time and associate a third predetermined window of time with the counter; and if the second time occurs within the first predetermined window of time from the first time, then discard the counter and the third window.

14. The stylus of claim 11, wherein the synchronization signal comprises a two-level digital signal having a duty cycle of approximately 50%.

15. The stylus of claim 11, wherein the logic is further configured to:

determine estimated values for an expected edge-point, a window begin-point, and a window end-point based at least in part on the first, second, and third times; and apply one or more of the estimated values to a detection of a subsequent edge of the synchronization signal.

16. The stylus of claim 11, wherein the logic is further configured to send data to the device at another data rate that is based on the data rate of the synchronization signal and at another timing that is based on the timing of the synchronization signal plus a predetermined offset.

17. The stylus of claim 11, wherein:

the synchronization signal comprises a period that is approximately equal to an inverse of the data rate of the synchronization signal; and the logic is further configured to synchronize the stylus to the device within a time period of between one-half and five periods of the synchronization signal.

18. A computer-readable non-transitory storage medium embodying logic that is configured when executed to:
- receive a synchronization signal from a device;
- determine a first time associated with detection of a first edge of the synchronization signal;
- determine a second time associated with detection of a second edge of the synchronization signal;
- determine whether the second time occurs within a first predetermined window of time from the first time;
- determine a third time associated with detection of a third edge of the synchronization signal;
- determine whether the third time occurs within a second predetermined window of time from the second time; and
- if the second time occurs within the first predetermined window of time from the first time, and if third time occurs within the second predetermined window of time from the second time, then:
  - determine that the synchronization signal is valid;
  - determine a data rate or a timing of the synchronization signal based on the first and second times or the first and third times; and
  - indicate that synchronization with the device has been achieved.

19. The stylus of claim 11, wherein the logic is further configured to:
- receive data from the device at another data rate and another timing that are based, respectively, on the data rate and the timing of the synchronization signal;
- determine estimated values for an expected edge-point, a window begin-point, and a window end-point of the received data; and
- apply one or more of the estimated values to a determination of one or more subsequent edges of data received from the device.

20. The stylus of claim 11, wherein the synchronization signal comprises a periodic signal with a frequency of approximately 10 kHz to 10 MHz.

* * * * *